Oct. 21, 1947.                M. MORRISON                2,429,273
                          ARC-WELDING CONVERTER
                           Filed Jan. 8, 1944
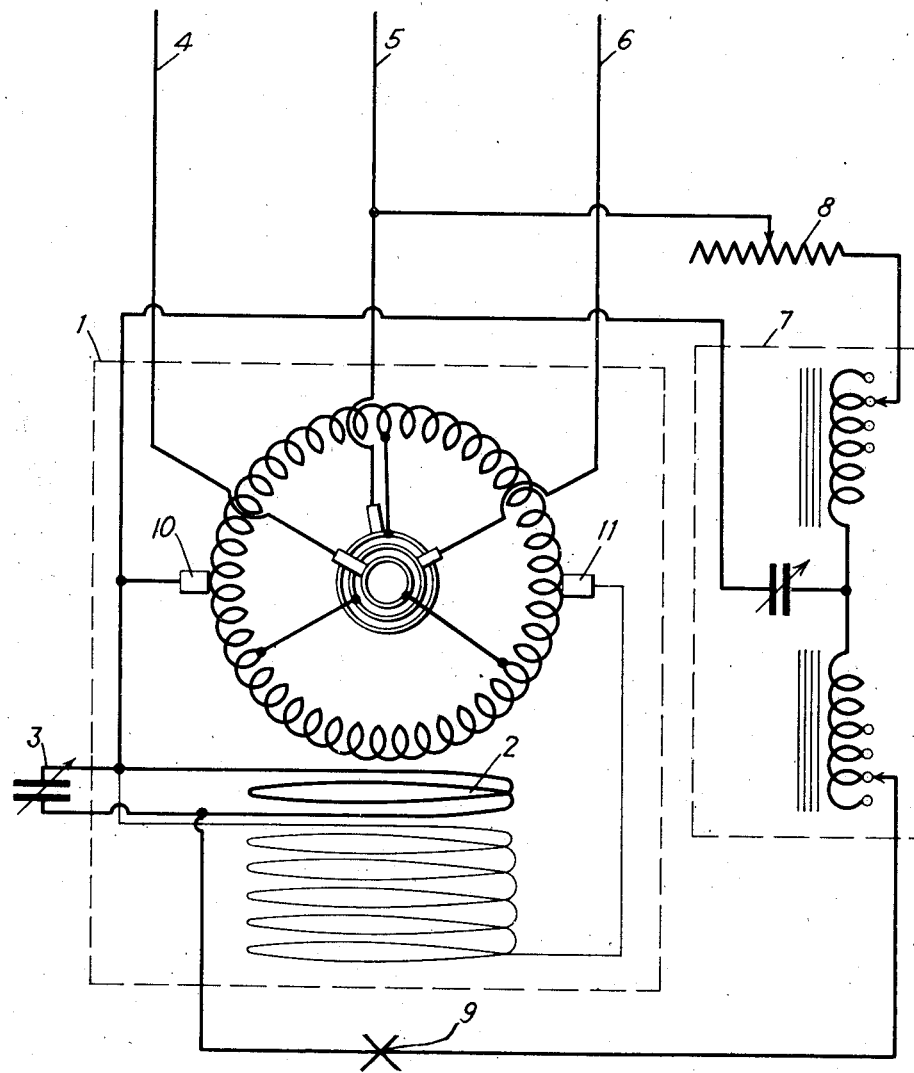
INVENTOR
Montfort Morrison Patented Oct. 21, 1947

2,429,273

UNITED STATES PATENT OFFICE 2,429,273

ARC-WELDING CONVERTER

Montford Morrison, Upper Montclair, N. J.

Application January 8, 1944, Serial No. 517,539

4 Claims. (Cl. 171—123)

The present invention relates to synchronous converters, it relates in particular to the operation of such converters through a neutral connection, and relates specifically to such machines when used in direct current arc-welding circuits.

Among the objects of the invention are; to provide, from an alternating current supply circuit, a source of direct current for arc welding having a higher apparatus efficiency than an equivalent motor-generator set; to provide a converter suitable for arc welding having a higher electrical efficiency than an equivalent motor-generator set; and to provide a converter device for such application having a basically lower manufacturing cost than an equivalent arc-welding motor-generator set.

In the prior art rotating dynamo electric machines for use in producing direct currents for arc welding application, motor-generator sets have been resorted to, the generator being a direct current machine with a differentially compounded field. The reason for the choice of such a set was to obtain a generator with drooping voltage characteristics combined with such current limiting characteristics as are conducive to the production of a stable arc for welding purposes.

These motor-generator sets have a very low overall apparatus efficiency because they require three machines to accomplish the results sought after. If the full load rating of the direct current generator is taken as having an apparatus efficiency of one, then the addition of the driving motor, which must be of approximately the same machine size, reduces this apparatus efficiency to 50%. The fact that the generator does not operate at full voltage but at a minor fraction of full voltage, reduces the machine efficiency to a minor fraction of 50% and the addition of the exciter still further reduces this value so that the overall apparatus efficiency is something of the magnitude of 20% of unity value, reckoned from the full voltage full load rating of the direct current generator. The electrical efficiency of such a three-machine set is, of course, the direct current machine efficiency multiplied by the alternating current machine efficiency, taking into account the losses in the exciter which brings the electrical efficiency down to a value lying within the range of between 50 and 60%.

Standard synchronous converter devices and circuits have not been applied successfully to arc welding because synchronous converters require the direct current voltage across the brushes to be maintained substantially constant or at least substantially constant with reference to a given polar field strength.

Synchronous converters have a high apparatus efficiency, a three-ring machine having an apparatus efficiency of about 66% above the direct current machine rating and a six-ring converter having an apparatus efficiency of nearly double that of the direct current machine rating.

Where transformer devices are employed in connection with synchronous converters, the electrical efficiencies of the order of 97% are commonly attained. The present invention provides circuits, means and methods of employing the outstanding qualities of the synchronous converter devices for the generation of suitable direct currents for welding circuits. In the present invention the employment of the synchronous converter is made possible by an improvement which allows the armature voltage across the direct current brushes to remain substantially constant and at the same time provide drooping characteristics in the load circuits making them suitable to arc welding application.

I have discovered that by the employment of my improved circuits in conjunction with synchronous converters, I can draw extremely heavy loads from the machine for arc welding purposes with drooping voltage characteristics without disturbing substantially the synchronous speed voltage of the machine.

These and other features will be pointed out and obvious in the reading of the description hereunder, particularly when taken in connection with the drawing which shows a diagrammatic representation of my invention.

An important feature of the present invention resides in the composition of alternating currents with direct currents in an arc-welding circuit, which composition provides a highly economical means of arc current control by the utilization of arc circuit elements which are reactive to the alternating current component of the composite wave form of the arc circuit current.

Such a composite current may be provided by a more or less standard synchronous converter which permits the attainment of high apparatus and electrical efficiency well known, to this type of machine, in the art. In addition, the utilization of such apparatus provides a low initial cost in addition to the high electrical efficiency.

Referring to the drawing, the circuit enclosed in dotted area I represents a synchronous converter which may be of a more or less standardized design. The coil 2 represents a series winding which is associated with the field circuit to neutralize the armature reaction and therefore may be in one case, a compound field coil; in the second case it may be a split pole field coil, and in the third case it may be an independent interpole or commutating pole coil. Coil 2 may be shunted by a variable capacitor 3 which in practice is usually one of the low voltage electrolytic types which permits of attaining extremely high capacitance with low cost and small size.

4, 5 and 6 represent alternating-current supply lines of a polyphase category, and in the present embodiment, the polyphase supply circuit is represented as a three-phase circuit, supplying the three-ring synchronous converter contained in the area 1. The dotted area 7 contains some type of electrical wave filter circuit and in the present embodiment, it is illustrated as a low-pass electrical filter, having adjustable characteristics. The circuit member 7 may have in series with it an adjustable resistor 8 and an arc load 9. 7 and 8 comprise the control circuit for the arc load 9, and the voltage is derived from one alternating current line or slip ring, which in the figure is illustrated as 5, and one direct current brush, which may be taken as 10, of the synchronous converter 1.

The voltage between any direct current brush and any slip ring of a synchronous converter of the type illustrated, has a wave-form which comprises a direct current component and an alternating current component. The direct current component has a value equal to half the full direct current voltage of the machine, and an alternating current component has a maximum plus and minus amplitude equal to the same said value. The voltage between 5 and 10, therefore, varies from zero value to the full value of the voltage between brushes 10 and 11 in a generally sinusoidal form.

The magnitude of this sinusoidally-pulsating direct-current in the load circuit 9 may be varied in amplitude by adjustment of rheostat 8, which per se, does not affect the wave-form of the said pulsating current.

By the proper selection in circuit 7, the amplitude of the alternating current component of the load circuit may be modified to suit the arc-load demand.

With such adjustments, the overall amplitude of the voltage between 5 and 10 may be thus reduced as well as may the alternating current component thereof be reduced and/or modified.

With such a structure, high initial voltages for striking the arc in the load 9 are available, and by means of circuit members 7 and 8, the full load arc current may be adjusted to give the most satisfactory operating conditions.

Different and other means may be provided for producing such wave-form of voltage for arc-welding circuits, and the applicant does not limit himself to the synchronous converter method of supplying such voltage wave-forms.

The circuit contained in dotted area 7, which is selective with reference to the supply frequency of leads 4, 5 and 6, is not limited to any particular type of frequency selective circuits and specifically is not limited to low-pass filter elements.

The shunting of the series compound field coil 2 by capacitor 3 may serve as a dual purpose, recalling that the coil 2 may also be a split pole coil and/or an interpole or commutating coil. The electrical cooperation of capacitor 3 with coil 2 provides a so-called anti-resonant circuit for the load 9, which may be selectively adjusted to have different frequency characteristics from those of circuit 7.

The second purpose of capacitor 3, in electrical cooperation with coil 2, is that it may be used to provide a more constant commutating field current to neutralize the armature reaction than is obtainable without it.

Having described one embodiment of my invention, the scope thereof is set forth in the claims hereunder.

What I claim is:

1. A synchronous converter device fed from a three-phase supply circuit and providing unidirectional output current for arc welding loads, comprising a three-phase synchronous converter connected to a three-phase supply circuit, said converter having a commutator provided with one brush adapted to carry arc welding load currents, an arc load circuit including an inductive reactor, and said arc load circuit being connected between said brush and one conductor of said supply circuit.

2. A synchronous converter device fed from a three-phase supply circuit and providing unidirectional output current for arc welding loads, comprising a three-phase synchronous converter connected to a three-phase supply circuit, said converter having a commutator provided with one brush adapted to carry arc welding load currents, an arc load circuit including an inductive reactor, said arc load circuit being connected between said brush and one conductor of said supply circuit, and said reactor being additionally connected to said brush through a capacitive load.

3. A synchronous converter device fed from a three-phase supply circuit and providing unidirectional output current for arc welding loads, comprising a three-phase synchronous converter connected to a three-phase supply circuit, said converter having a commutator provided with one brush adapted to carry arc welding load currents, said converter having a series field shunted by a condenser, one terminal of said field being connected to said brush, an arc load circuit including a low-pass electrical wave filter, and said arc load circuit being connected between the remaining series field terminal and one conductor of said supply circuit.

4. A synchronous converter device fed from a three-phase supply circuit and providing unidirectional output current for arc welding loads, comprising a three-phase synchronous converter connected to a three-phase supply circuit, said converter having a commutator provided with one brush adapted to carry arc welding load currents, an arc load circuit including a low-pass electrical wave filter, and said arc load circuit being connected between said brush and one conductor of said supply circuit.

MONTFORD MORRISON.

REFERENCES CITED

The following references are of record in the file of this patent:

UNITED STATES PATENTS

| Number | Name | Date |
|---|---|---|
| 732,906 | Steinmetz | July 7, 1903 |
| 1,645,149 | Mann | Oct. 11, 1927 |
| 2,000,161 | Burgett | May 7, 1935 |
| 2,294,498 | Heindlhofer | Sept. 1, 1942 |
| 2,255,141 | Weir | Sept. 9, 1941 |

FOREIGN PATENTS

| Number | Country | Date |
|---|---|---|
| 191,297 | England | Jan. 11, 1923 |